United States Patent [19]

Dahl

[11] 4,229,564
[45] * Oct. 21, 1980

[54] FRIEDEL-CRAFTS POLYMERIZATION OF MONOMERS IN THE PREPARATION OF POLYKETONES AND POLYSULFONES

[75] Inventor: Klaus J. Dahl, Atherton, Calif.

[73] Assignee: Raychem Corporation, Menlo Park, Calif.

[*] Notice: The portion of the term of this patent subsequent to Apr. 27, 1993, has been disclaimed.

[21] Appl. No.: 680,068

[22] Filed: Apr. 26, 1976

Related U.S. Application Data

[60] Continuation-in-part of Ser. No. 597,496, Jul. 21, 1975, Pat. No. 4,111,908, and Ser. No. 451,521, Mar. 15, 1974, Pat. No. 3,953,400, which is a continuation-in-part of Ser. No. 218,465, Jan. 17, 1972, abandoned, which is a continuation-in-part of Ser. No. 115,824, Feb. 17, 1971, abandoned, said Ser. No. 597,496, is a division of Ser. No. 366,326, Jun. 4, 1973, Pat. No. 3,914,298, which is a division of Ser. No. 218,466, Jan. 17, 1972, abandoned, which is a continuation-in-part of Ser. No. 115,824.

[51] Int. Cl.² ............... C08G 67/00; C08G 75/20
[52] U.S. Cl. .................. 528/175; 528/125; 528/126; 528/128; 528/205; 528/206; 528/220; 528/222; 528/225; 528/360; 528/361; 528/391
[58] Field of Search .............. 260/47 R, 47 C, 61, 260/49; 528/360, 361, 125, 126, 128, 175, 391, 220, 222, 225, 205, 206

[56] References Cited

U.S. PATENT DOCUMENTS 3,441,538  4/1969  Marks et al. .................. 260/49
4,111,908  9/1978  Dahl .................. 528/361

FOREIGN PATENT DOCUMENTS 1086021  10/1967  United Kingdom .................. 260/47 R
1109842   4/1968  United Kingdom .................. 260/49
1153527   5/1969  United Kingdom .................. 260/49

Primary Examiner—Lester L. Lee
Attorney, Agent, or Firm—Lyon & Lyon

[57] ABSTRACT

The molecular weight of highly aromatic polymers made by the Friedel-Crafts polymerization of EN monomers of the formula Ar—L—Ar¹—X, wherein X is selected from $SO_2Y$ or COY, Y being a radical selected from —OH, halogen, or alkyl, wherein Ar and Ar¹ are independently

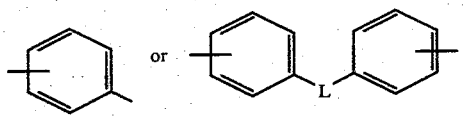

wherein L is —CO—, —$SO_2$—, phenyleneoxy, —NH-CO—, a covalent bond, —O—, or —$CR_2$—, wherein each R is independently hydrogen, an alkyl or fluoroalkyl group, phenyl or a phenyl group substituted by an electron withdrawing group such as halogen, $NO_2$ or —CN, is controlled by including in the reaction mixture an acylatable aromatic compound whose rate of acylation under Friedel-Crafts conditions is at least about 150 times that of benzene. The molecular weight of other polymers made from EN type monomers by Friedel-Crafts catalysis can also be controlled in this way.

29 Claims, No Drawings

FRIEDEL-CRAFTS POLYMERIZATION OF MONOMERS IN THE PREPARATION OF POLYKETONES AND POLYSULFONES

CROSS-REFERENCE TO RELATED APPLICATIONS

This is a continuation-in-part of my copending application Ser. No. 451,521 filed Mar. 15, 1974, now U.S. Pat. No. 3,953,400 which is a continuation-in-part of application Ser. No. 218,465, filed Jan. 17, 1972 (now abandoned) which was a continuation-in-part of application Ser. No. 115,824 filed Feb. 17, 1971 (now abandoned). This application is also a continuation-in-part of my copending application Ser. No. 597,496 filed July 21, 1975, now U.S. Pat. No. 4,111,908 which is a divisional of application Ser. No. 366,326 filed June 4, 1973 and now U.S. Pat. No. 3,914,298 which is a divisional of application Ser. No. 218,466 filed Jan. 17, 1972 (now abandoned) which is a continuation-in-part of application Ser. No. 115,824 filed Feb. 17, 1971. The disclosure of these applications are incorporated by reference.

FIELD OF THE INVENTION

This invention relates to polyaryl ketone and polyaryl sulfone polymers and more particularly, to melt processable polyaryl ketone and polyaryl sulfone polymers and the method by which they are made.

BACKGROUND OF THE INVENTION

In the continuing search for polymers suitable for use at elevated temperatures, many different repeating structures involving diverse connecting linkages have been suggested, e.g., aromatic structures connected by linkages such as imides, ethers, sulfones, ketones, etc. Unfortunately, as potential performance at elevated temperature has been enhanced, amenability of the polymer candidates to classical molten techniques of polymer fabrication has declined. More often than not, the same decline in melt processability accompanies attempts to produce temperature resistant polymers of elongation of at least about 50%, a necessary property for many polymer applications, e.g., if the polymer-insulated wire is to be capable of being twisted about itself without cracking of the insulation.

Aromatic polyketones, for example, are known to enjoy good resistance to thermal degradation. Bonner, in U.S. Pat. No. 3,065,205, suggested the Friedel-Crafts catalyzed polymerization of certain reactants to yield polyketones, listing as typical Friedel-Crafts catalysts ferric chloride and boron trifluoride. The reactants proposed fall into two classes, the first consisting of aryl ethers and polynuclear aromatic compounds, a member of which is heated with a member of a second class consisting of aliphatic and aromatic diacyl chlorides. The two basic reactions taught by this patent, then, can be summarized as follows:

(1) $n(HR-O-RH) + n(Cl-A-Cl) + nHCl + H-(R-O-R-A)_nCl$ (2) $n(HBH) + n(Cl-A-Cl) + nHCl + Cl(A-B)_nH$ where HBH is a polynuclear aromatic hydrocarbon such as naphthalene, HR—O—RH is an ether such as diphenyl ether, and Cl—A—Cl is a diacyl chloride such as terephthaloyl chloride or phosgene. When phosgene and diphenyl ether are allowed to react, the resulting polymer will contain the repeating unit

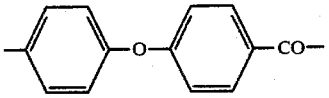

An entirely different approach is taken by Farnham and Johnson in British Pat. No. 1,078,234 (corresponding to U.S. application Ser. No. 295,519, filed July 16, 1963). Here, polyarylene polyethers are produced by reaction of an alkali metal double salt of a dihydric phenol with a dihalo benzenoid compound. The dihydric phenol may contain a keto group—thus, 4,4′-dihydroxy benzophenone is claimed to give rise to a polyketone (See claim 15 of British patent).

The same repeating unit is disclosed in British Pat. No. 971,227 to arise from the reaction of diphenyl ether with phosgene, from the polycondensation of diphenyl ether-4-carbonyl chloride, and from the reaction of diphenyl ether with diphenyl ether-4,4′-dicarbonyl chloride.

A number of patents dealing with improved methods of making polyketones have since issued. Thus, for example, processes disclosed in U.S. Pat. Nos. 3,441,538 and 3,442,857 derive advantage by resort to hydrogen fluoride-enhanced boron trifluoride catalysis, a system earlier recognized in *Boron Fluoride and its Compounds as Catalysts, etc.*, Topchiev et al, Pergamon Press (1959), p. 122; *J. Org. Chem.* 26 2401 (1961); and I&E Chem. 43, 746 (1951). A further patent dealing with an improved process is British Pat. No. 1,086,021. The foregoing are incorporated herein by reference to illuminate the background of this invention.

Example 10 of British Pat. No. 971,227 describes a manufacturing process for the polymer of repeating unit

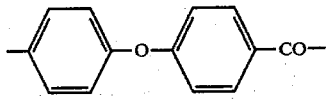

The product showed no signs of flowing up to 350° C. and apparently required spinning from solution for fiber formation. The product is also variously described in Example 1 of U.S. Pat. No. 3,441,538 as yielding polymer of low elongation and tough, opaque brown films, while in British Pat. No. 1,153,527 this polymer is characterized as highly crystalline and intractable from the standpoint of conventional melt fabrication.

From the foregoing it will appear that while this polymer of a basically simple repeating unit possesses characteristics which render it a feasible candidate for high temperature application, its intractability in heretofore realized embodiments has rendered it ill-suited to conventional melt processing. Thus, a need has existed for melt processable polyketones comprised of the repeating unit

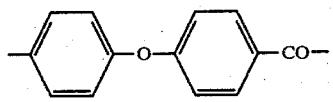

if its other advantages are to be fully utilized.

The manner in which these needs are solved is described in my copending application, Ser. No. 451,521 in which a process is described for controlling the molecular weight of the polymer of that repeat unit to achieve a melt-processable polymer. A similar process for obtaining a polymer of the repeat unit

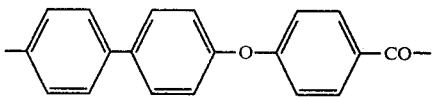

is described in my U.S. Pat. No. 3,914,298, issued Oct. 21, 1975, the disclosure of which is incorporated by reference.

These polymers are useful in many diverse applications where thermal stability is important.

Other highly aromatic polymers having different repeat unit promise many of the same advantages as polyaryl ketones. For example, polyaryl sulphones of structure

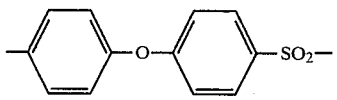

are described in British Pat. No. 1,109,842. These polymers are made by the Friedel-Crafts polymerization of either

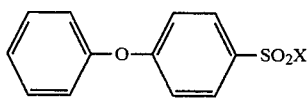

or a mixture of

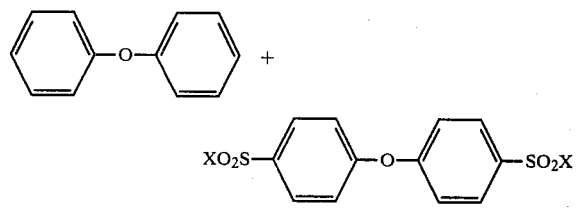

where X is halogen.

Although a wide variety of highly aromatic polymers are known to the prior art as indicated by this discussion, there still remains unmet a need for a simple process to obtain such polymers in a form in which they are melt processable.

OBJECTS OF THE INVENTION

One object of this invention is to provide melt-processable highly aromatic polymers.

A more specific object of this invention is to provide melt-processable polyaryl ketones and polyaryl sulfones.

Another object of this invention is to provide an improved process for the preparation of highly-aromatic polymers, particularly polyaryl ketones and polyaryl sulfones.

Yet another object of this invention is to provide an improved process for preparing melt-processable polyaryl ketones and polyaryl sulfones.

A further object of this invention is to provide an improved process for molecular weight control in the preparation of highly aromatic polymers by the Friedel-Crafts reaction.

DETAILED DESCRIPTION OF THE INVENTION

In my copending application, of which this application is a continuation-in-part, a process is described for making a polymer of the repeat unit

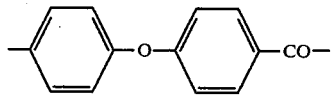

in which the molecular weight of the polymer is controlled to give a melt-processable polymer. That process involves the polymerization of a monomer of the structure

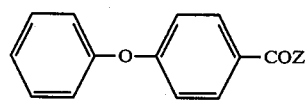

wherein Z is selected from hydroxy, alkyl and halogen groups. The polymerization reaction is carried out in the presence of a Friedel-Crafts catalyst and a molecular weight control agent referred to as a "capping agent". The control agents are acylatable aromatic compounds whose rate of acylation under Friedel-Crafts conditions is at least about 150 times as great as that of benzene itself. Under the Friedel-Crafts conditions used in the polymerization they function as nucleophillic reagents.

The monomer used in this process described above is of a type I refer to as an "EN" monomer in that it contains both an electrophillic reactive site and a nucleophillic reactive site. The electrophillic center is formed at the acyl group while the nucleophillic center is on an aromatic ring and can be regarded as being located at the carbon atom where replacement of a hydrogen occurs in the chain forming process leading to the polymer.

I have now discovered that molecular weight control, as described in my copending application Ser. No. 451,521, can be practical in Friedel-Crafts polymerization reactions using all types of EN monomers. Thus by the present invention, a wide variety of highly aromatic polymers can be made in which the molecular weight has been controlled to render the polymer melt-processable.

Monomers preferred for use in this process are those that yield polyaryl ketones and polyaryl sulfones. Put another way, the preferred monomers are those that form either carboxonium or sulfonium electrophillic centers under the reaction conditions as typically represented for Friedel-Craft reactions.

Preferred monomers for use in this invention are of the formula Ar—L—Ar'—X, wherein X is selected from $SO_2Y$ or COY, Y being a radical selected from —OH, halogen or alkyl, wherein Ar and Ar' are substituted or unsubstituted

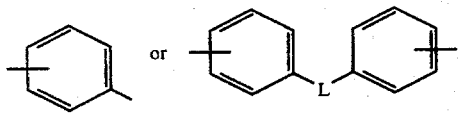

having a replaceable hydrogen atom under Friedel-Crafts conditions, wherein L is —CO—, —SO₂—, phenyleneoxy, —NHCO—, a covalent bond, —O—, or —CR₂ wherein each R is independently hydrogen, an alkyl or fluoroalkyl group, phenyl or a phenyl group substituted by an electron withdrawing group such as halogen, —NO₂ or —CN. In the case of COY, preferably Y is fluorine. In the case of —SO₂Y, Y is preferably chlorine.

Since the basic reaction conditions for making polyketone-type and polysulfone type polymers have been described at length in the patents referenced above, emphasis is laid in the following description of the preferred embodiments upon those novel features from which the many advantages of the invention derive.

To obtain melt processable polymer of elongation greater than about 50%, it has now been found that mean inherent viscosity must be controlled to within the range from about 0.8 to about 1.65. Below about 0.8 precipitous falloff of percent elongation can be occasioned by process variation, while polymer of mean inherent viscosity greater than about 1.65 has a melt viscosity so high as to yield, at best, rough extrudate rather than the smooth, coherent coat necessary for wire insulation. Preferably, mean inherent viscosity is maintained within the range from about 1.2 to about 1.6, most preferably about 1.4. In extruding polymer of inherent viscosity greater than about 1.5 onto small gauge wire at running speed of 300–400 fpm, melt fracture has on occasion been experienced. Polymer of greater viscosity, of course, can be extruded onto large gauge wire and in the form of rods for chowdering or fiber drawing operations.

Inherent viscosity, and therefore melt processability, is controlled by the judicious employment, as molecular weight control agents, of selected aromatic capping agents. The capping agent terminates polymerization through Friedel-Crafts catalyzed acylation reaction with the active polymer chain. For example, boron trifluoride catalysis of the polymerization of monomers yielding poly(benzophenone ether) proceeds through formation of a highly reactive carboxonium ion-containing intermediates, such as, in the case of acyl fluoride monomer, a tetrafluoborate, e.g.,

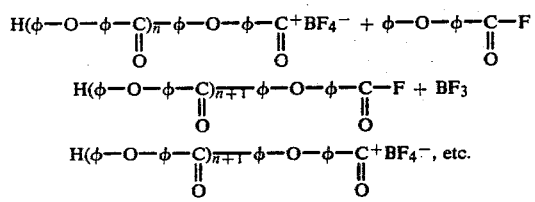

The chain is terminated by a nucleophillic capping agent and boron trifluoride subsequently removed, for example, thus:

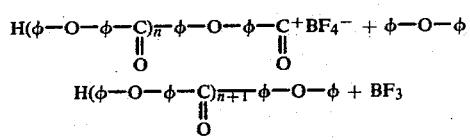

The chain

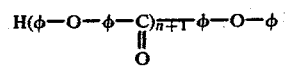

itself can terminate the polymerization of other chains by reacting at either end, both of which are nucleophillic, with the carboxonium ion-containing intermediate of the other chains. It is the cumulative interruption of chain growth that acts to control molecular weight. From the foregoing, it will be apparent that the capping agent should be nucleophillic, i.e., have a readily replaceable hydrogen and enjoy reactivity toward acylation of the same order of magnitude as that of the monomer and it has been found that for effective molecular weight control in the molecular weight range which provides melt processable polymer the capping agent should enjoy reactivity to acetylation (relative to benzene reativity equal to 1) greater than about 150. For example, the literature [Cf. Kimoto, *J. Pharm. Soc. Japan* 75, 727 (1955) and Brown et al, *J. Am. Chem. Soc.* S], 5929 (1959) yields the following values for relative rate of acetylation in the system CH₃COCl/ALCl₃:

TABLE I

| AGENT | RELATIVE RATE OF ACETYLATION |
|---|---|
| Benzene | 1.00 |
| Biphenyl | 205 |
| 4-acetyldiphenyl ether | 448 |
| Diphenyl ether | 11,600 |
| 4-methyldiphenyl ether | 81,000 |

The aromatic capping agent employed is preferably non-aliphatic and most preferably non-ring-substituted, as by nitro, methyl, aryloxy methoxy, methoxy carbenyl or acetyl where high temperature polymer performance is desired. In such case, it will readily be appreciated that agents subject to oxidative or thermal degradation are to be avoided as giving rise to discolored polymer, etc. Most generally, any condensed polynuclear aromatic system or aryl-substituted benzene of sufficient reactivity to acylation and soluble in the reaction medium can be employed, i.e., biphenyl, diphenylether, phenoxybenzophenone, and 4,4'-diphenoxybenzophenone. It will be appreciated that the various molecular weight control agents perform their function in ways that vary. When biphenyl is used as the molecular weight control agent, polymerization of a chain is terminated by the reaction of a para-hydrogen in one of the biphenyl rings as follows:

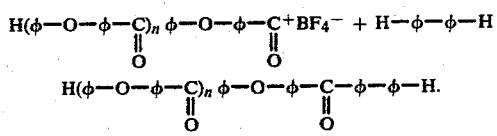

When this reaction occurs, the presence of a carbonyl group deactivates the para hydrogen in the other ring to further substitution, i.e., renders that ring less nucleophillic. Thus biphenyl, which may be regarded as a monofunctional molecular weight control agent, is a more efficient molecular weight control agent than is diphenyl ether as further substitution on the deactivated ring is unlikely since only the end of the polymer molecule opposite the biphenyl moiety is available for further substitution to cause chain growth. As a result, in a polymerization in which biphenyl is used as a molecular weight control agent it will normally be found at one end of a chain. By contrast a diphenyl ether group is more likely to be found along the polymer backbone removed from the chain end since diphenyl ether is a difunctional molecular weight control agent.

Within the range of inherent viscosity required for melt processability, log (inherent viscosity) appears to be linearly related to log (mole percent capping agent). Thus, for example, the following relationship has obtained in the polymerization of p-phenoxybenzoyl chloride in the system HF/BF$_3$:

TABLE II

| CAPPING AGENT | MOLE % AGENT | MEAN INHERENT VISCOSITY OF PRODUCT |
|---|---|---|
| Biphenyl | 0.25 | 2.25 |
| | 0.35 | 1.80 |
| | 0.50 | 1.40 |
| | 0.75 | 1.05 |
| | 1.00 | 0.87 |
| Diphenyl ether | 0.36 | 2.34 |
| | 0.77 | 1.12 |
| | 1.14 | 1.04 |
| | 2.01 | 0.56 |
| | 4.01 | 0.30 |

The reaction conditions were as follows:
Monomer concentration 1 mole/liter. The reaction was run at 0° C. with 5 psi BF$_3$ for 6 hours followed by 20° C. with 5 psi BF$_3$ for 15 hours.

In a practical sense, then, a polymer derived from an EN monomer will have the structure $(NE)_x$—$\phi$—$\phi$ when biphenyl is used as the molecular weight control agent whereas the use of diphenyl ether will lead to a polymer of the structure $(NE)_x$—$\phi$—O—$\phi$—$(EN)_y$ where x and y are the number of repeat units in the respective polymer chains. From these considerations it will be appreciated that monofunctional molecular weight control agents lead to polymers of the formula $(NE)_x$—M wherein M is the moiety representing the molecular weight control agent. Difunctional molecular weight control agents result in polymers of the formula $(NE)_x$—M'—$(EN)_y$ wherein M' is the moiety representing the molecular weight control agent. It will be appreciated by those skilled in the art that trifunctional nucleophiles or nucleophiles of higher functionality can also be used. However, their use will necessarily result in a branched polymer with some reduction in melt processability.

It will be recognized that the extent to which the molecular weight of the polymer is affected by the presence in the polymerization of the control agent can vary according to the nature of the control agent as described above and the amount of agent used. Thus the present invention contemplates the use of a control agent in an amount effective to reduce the molecular weight of the polymer from that which would result in the absence of such an agent. The amount of agent required to achieve a desired level of control can readily be determined by one skilled in the art. As previously indicated, to achieve a melt processable polymer it is preferred to employ the control agent in an amount which will result in a polymer having a mean inherent viscosity with the range of from about 0.8 to 1.65.

It has also been found that, if polymer within the requisite range of mean inherent viscosity and yet having tensile elongation to break of at least about 50% at 25° C. when elongated at a rate of 200 percent per minute (hereinafter referred to as elongation) is to be obtained, polymerization must be conducted in such fashion as to prevent polymer contamination by transition metals, e.g., Fe, Cr, Co, Ni, etc., since these are believed to give rise to premature crosslinking and in any case provide polymer within the requisite range in inherent viscosity but of very low elongation. For example, Example 1 of U.S. Pat. No. 3,441,538 polymerizes p-phenoxybenzoyl chloride in the system HF/BF$_3$, using a stainless steel reaction vessel. Films of inherent viscosity of 1.18 are reportedly obtained, the polymer exhibiting elongation of no more than 7.2 percent and hence being quite unsuited to wire insulation application.

Accordingly, reaction should proceed in an environment essentially uncontaminated by transition metals, as in plastic (e.g., polytetrafluoroethylene (PTFE), polyethylene, polychlorotrifluoroethylene (PCTFE) plastic-coated, aluminum or other such vessels. Most preferably, the environs of polymerizations are entirely non-metallic.

Polymers of the repeat units

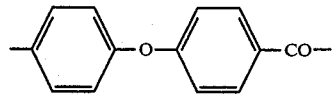

and

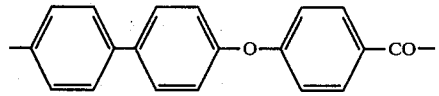

are the presently preferred polyaryl ketones. It will be apparent that various monomers can be employed, e.g. p-phenoxy benzoyl fluoride and p-biphenylyloxybenzoyl fluoride or the corresponding chlorides. p-Phenoxybenzoyl fluoride and p-biphenylyloxybenzoyl fluoride are the preferred monomers, and are most generally obtained by reacting a corresponding non-fluorine halide (preferably the chloride) with hydrogen fluoride. This can be immediately followed by introduction of boron trifluoride and commencement of polymerization. Alternatively, the formed acyl fluoride can be recovered from hydrogen fluoride by distillation or the like for subsequent polymerization. In the latter case, color bodies formed by HF reaction with impurities commonly present in the commercial grade acyl chloride are left behind.

p-Phenoxybenzoic acid, p-biphenylyloxybenzoic acid or the corresponding C$_1$–C$_3$ alkyl benzoates may be employed as monomers in lieu of the acyl halides. The acid itself may be obtained by Ullmann condensation of phenol and p-chlorotoluene, followed by cobalt acetate-catalyzed oxidation to the acid. The ester monomers are secured by alcoholysis of the acid chloride or by esterification of the acid.

Hydrogen fluoride is employed in every case as solvent for the formed polymer and can participate in the polymerization reaction as well. Thus, for example, the mechanism by which the acid chloride is polymerized appears to include conversion of the monomer to an acid fluoride intermediate. Polymerization may be had by admitting BF₃ to a hydrogen fluoride solution containing from about 3 to 30% by weight, preferably from about 15 to 25% by weight monomer. As an alternative to the use of HF alone, BF₃ may be admitted to a solution of monomer in HF and liquid sulfur dioxide, as is discussed hereinafter.

Where polymerization is conducted in HF alone, the temperature of polymerization is preferably between about 0° C. and 50° C., most preferably between about 0° C. and room temperature. Polymerization temperature equal to or greater than about 100° C. should be avoided, while temperatures less than 0° C., will, of course, decrease polymerization rate. The preferred course, however, is to conduct polymerization in the presence of, e.g., 50% by volume liquid SO₂, in which event temperature is maintained at about 0° C. to maintain the SO₂ in the liquid state at the pressure prevailing in the reaction vessel. SO₂ appears to deprotonate ketone moieties of the polymer, so that BF₃ is held not in ionic association therewith, but more loosely in a donor-acceptor complex. SO₂ is similarly believed to influence the extent to which water and alcohol byproducts of, respectively, acid and ester polymerization bind BF₃. In any case, heating during the preferred spray drying workup also acts to free bound BF₃, so that presently the beneficial effect of SO₂ in this regard has not been quatitatively established. However, the use of SO₂ has been found advantageous in numerous other regards. Where polymer is recovered by precipitation in a relative non-solvent, e.g., acetone, methylethylketone, dimethyl formamide, dimethyl acetamide, N-methylpyrrolidone, acetic acid or chlorinated acetic acid, the liquid SO₂ minimizes undue temperature rise associated with heat of dilution of the hydrogen fluoride in the solvent. Unfortunately, wet workup exposes polymer to nucleophilic solvents capable of interracting with the polymer to introduce thermal instability.

It has been found that resistance of the polymer to attack by ketonic solvents and the like is greatly enhanced if the polymer produced as hereinabove described is subjected to extraction with a solvent therefor, preferably with an aliphatic ketone such as acetone or with a chlorinated aliphatic hydrocarbon such as trichloroethylene. Extraction preferably is undertaken at temperature within the range from about 30° to about 50° C., and is continued for a period of time sufficient to extract from about 4 to 10% by weight of the polymer. The resulting polymer, while yet within the range of mean inherent viscosity requisite for melt processability, is essentially free of chains of inherent viscosity less than about 0.6. Extraction where desired should be made before the polymer has been brought to a temperature above its glass transition temperature (about 160° C. for poly(bnezophenone ether) homopolymer) since the onset of crystallization reduces extractability of the lower molecular weight moieties.

Parenthetically, it should be noted that acetone can be characterized as a "non-solvent" when considering the relatively benign exposure attending the precipitative workup, and can yet be employed to leach out lower molecular weight moieties during the longer periods associated with extraction. Indeed, even when employed as a "non-solvent" in precipitating raw polymer, acetone can influence mean inherent viscosity to a measurable extent. For example, addition of a 20% by weight solution of poly(benzophenone ether) in HF diluted to 5% solids content with SO₂ to a stirred mixture of SO₂-acetone leads to precipitation of polymer whose mean inherent viscosity depends on the acetone concentration as shown below:

TABLE III

| Percent Acetone in Sulfur Dioxide | Inherent Viscosity of Polymer Precipitate |
|---|---|
| 15 | 1.57 |
| 17.5 | 1.56 |
| 20 | 1.55 |
| 25 | 1.51 |
| 100 | 1.50 |

While leaching polymer resulting from wet workup provides satisfactory product, it would be advantageous to forego that step, for which reason I presently prefer to spray dry the product of polymerization rather than subject the same to wet workup by non-solvent precipitation. The polymer may be spray dried in HF alone, employing vessels whose walls are appropriately lined against corrosion. However, I have found that liquid SO₂ affords polymer lighter in color than arises from spray drying from HF along. Used in lieu of HF for dilution to solids contents best suited to spray dying, SO₂ reduces corrosion of spray dryer walls and achieves substantial economies by reason of its relatively lower cost. While a detailed description of SO₂ spray drying appears in my aforesaid U.S. Pat. No. 3,751,398, the presently preferred process may be briefly described as entailing dilution of the polymer solution to about 1–2% solids, providing a solution containing a major proportion, preferably 90–99% by volume SO₂. The dilute solution is conveyed under pressure of, e.g. 20 psi at −6 C. to a two fluid nozzle, from which it is sprayed and contacted with hot air or gaseous SO₂. Inlet gas temperatures on the order of 190°–220° C. afford particulate polymer having but about 2–5% by weight fluorine volatiles. Preferably, fluorine content of the spray dried product is thereafter reduced to less than 100 ppm in a vacuum oven operating at, e.g., 140° C.

The presently preferred monomers for use in preparing polyarylsulfones are

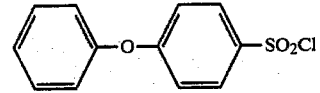

and the biphenyl homologue

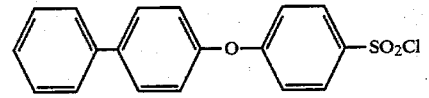

although other sulfonyl halides and alkyl esters may be used. The sulfonic acids are also suitable as monomers. Ortho and meta isomers of the biphenyl homolgue may also be used.

The melt processable polymers of the invention can be readily extruded onto electrical conductors, most commonly in the case of wires in coats of from about 5 to 12 mils in thickness. The coated wire is preferably annealed, as by exposure to about 220° C. for about 2 minutes, to produce a generally abrasion resistant, stronger and dimensionally stable insulative coating. Following annealing the preferred polymer has elongation on the order of about 125%.

It has also been discovered that, following fabrication, the polymer can be thermally crosslinked to enhance solvent resistance and dimensional stability above the melting point. For example, when poly(benzophenone ether) coated wire is exposed in an inert atmosphere at about 1200° C. for from about ¼ to about 2 seconds, the resulting product is at least surface crosslinked and displays good resistance to solvent crazing even where acetone or other extraction has not previously been had. In general, crosslinking can be had at polymer temperatures within the range from about 300° C. to about 600° C. It will be appreciated, of course, that both annealing and thermal crosslinking are inversely time and temperature dependent, and suitable times and temperatures for each will readily occur to the art-skilled from the aforegoing, all depending upon contemplated service conditions and like considerations.

The invention is further illustrated by the following examples, in which all parts and percentages are by weight and temperatures in °C. unless otherwise indicated. Throughout, mean inherent viscosity is determined according to the method of Sorenson et al, *Preparative Methods of Polymer Chemistry* Interscience (1968), p. 44 [0.1 g polymer in 100 ml. soln. of conc. $H_2SO_4$ at 25° C.].

EXAMPLE 1

Into a six-liter PTFE bottle, equipped with a PTFE gas inlet, magnetic stirrer, and PTFE coil condenser cooled with a dry ice-acetone bath was placed 1182 g (5.096 moles) of p-phenoxybenzoyl chloride and 4.132 g (0.027 moles; 0.525 mole percent) of biphenyl. Four liters of anhydrous hydrogen fluoride was condensed into the reactor at −78°, and 532 g (7.85 moles) of boron trifluoride was slowly added under slight pressure. After addition was complete, the reaction was allowed to come to room temperature and remain for 20 hours under a positive pressure of boron trifluoride.

The polymer solution was diluted with anhydrous hydrogen fluoride and poured into rapidly stirred acetone, which precipitated the polymer. The polymer was washed with acetone and water, followed by vacuum drying at 150° to 160°, to give 900 g (90%) of colorless polymer of inherent viscosity 1.45 (0.1 g/100 ml conc. $H_2SO_4$, 25°). The polymer exhibited elongation greater than about 125%. The crystalline melting point (differential scanning colorimeter) was about 365° C.

EXAMPLE 2 a. Preparation of p-phenoxybenzoyl fluoride

A 50 ml PCTFE reactor tube was charged with 23.25 g (0.10 moles) of p-phenoxybenzoyl chloride and a magnetic stir bar. The tube was connected to a PCTFE vacuum line (Toho Kasei Co., Ltd. Osaka, Japan) and 10 ml of anhydrous hydrogen fluoride was condensed into the reactor tube at −196°. The tube was warmed to 0°, and held at this temperature for two hours. Excess hydrogen fluoride, together with hydrogen chloride, is then removed by distillation. The resulting distillation residue was dissolved in 20 ml methylene chloride to which was added 1 g of sodium fluoride, the latter as a scavenger for residual HF. The solution was stirred overnight, then filtered, and taken to dryness to give a slightly yellow crystalline mass. Distillation at 100° to 110° (bath)/0.1 mm Hg gave 20.00 g (0.0926 moles, 93%) of colorless liquid which solidified at room temperature; mp 39°-40°. Gas chromatographic analysis indicated one component. Methanolysis gave the same methyl ester as obtained from p-phenoxybenzoyl chloride. The infrared spectrum (KBr) showed a strong band at 1803 cm$^{-1}$, indicative of acyl fluorides.

b. Polymerization of p-phenoxybenzoyl fluoride

A 50 ml PCTFE tube was charged with 5.50 g (25.55 mmoles) of p-phenoxybenzoyl fluoride, 0.0118 g (0.0694 mmoles, 0.271 mole percent) of diphenyl ether and a stir bar. The tube was connected to the PCTFE vacuum line and purged with nitrogen. Into the reaction tube was then condensed at −196° 20 ml of anhydrous hydrogen fluoride, followed by 2.60 g (38.29 mmoles) of boron trifluoride. After warming to room temperature, the reaction mixture was stirred for one hour. Thus, excess boron trifluoride was purged from the reactor system with nitrogen. The orange-yellow viscous polymer solution as diluted with anhydrous hydrogen fluoride and poured into rapidly stirred acetone which caused precipitation of the polymer. The polymer was washed with acetone and water, followed by vacuum drying at 200°, to give 4.80 g (95%) of colorless granular powder of inherent viscosity 1.56 (0.1 g/100 ml conc. $H_2SO_4$, 25°), elongation greater than about 125%.

EXAMPLE 3

The procedure of Example 2b was repeated using 0.204 mole percent of diphenyl ether to give a polymer of inherent viscosity 2.00. The polymer was compression molded at 420° to give a colorless, transparent, and flexible slab. This slab turned opaque on annealing at 225° for 5 minutes. The polymer exhibited elongation greater than 125%.

EXAMPLE 4

A one-kilogram sample of poly(benzophenone ether) of inherent viscosity 1.43 was extruded through a ¾-inch Brabender extruder at 410° to 420°. The resulting polymer ribbon was pelletized and fed into a Brabender extruded equipped with a standard wire coating die. Preheated 20 AWG nickel-coated copper wire was passed through the die and the polymer melt was drawn down onto the wire to give a tight and coherent wire insulation. This insulation shows an elongation of 125% and a tensile strength of 19,000 psi. The insulated wire was exposed to various elevated temperatures in air and the time duration which effected a decrease in elongation to 50% was determined. These data are shown below.

| Temperature °C. | Time to 50% Elongation hrs. |
| --- | --- |
| 360 | 19 |
| 340 | 37 |
| 320 | 89 |
| 300 | 187 |
| 280 | 648 |

At 250° C. the insulation exhibits a tensile strength of 8500 psi and an elongation of 150%. The example demonstrates the conjoint attainment of advantageous melt processability, high elongation and good high temperature properties (i.e., excellent oxidative stability) which lies at the heart of the invention.

EXAMPLE 5

A sample of poly(benzophenone ether) prepared in a PTFE reactor (inherent viscosity 1.55) gave a colorless slab on compression molding and showed no metal contamination by X-ray fluorescence spectroscopy. This material developed cracks when exposed to acetone under stress. Extraction of this polymer in a Soxhlet extractor with acetone for 15 hours gave a fluffy white extract (4%) of inherent viscosity 0.69, while the extracted polymer now showed an inherent viscosity of 1.62. A slab molded from the extracted polymer did not stress-crack in acetone. Tensile bars were pulled in the Instron apparatus and acetone was sprayed against the bars when the yield point was reached; the effect of this treatment on tensile strength and elongation is shown below:

| Property | Polymer, Not Extracted | Polymer Extracted |
|---|---|---|
| Yield Strength, psi | 12,600 | 12,300 |
| Break Strength, psi | 9,600 | 12,400 |
| % Elongation | 20 | 85 |

EXAMPLE 6

This example demonstrates the preferred spray drying workup. A hydrogen fluoride solution of 25 weight % of poly (benzophenone ether) was diluted with liquid sulfur dioxide to a solids content of 1.3%. This brought about a decrease in solution viscosity from 1900 cp to 2 cp. The solution, contained in a poly(chlorotrifluoroethylene) coated vessel was then fed to a laboratory spray dryer (Koch Model 10D, 1 meter diameter). An air pressure of 5-15 psig in the feed vessel provided the driving force to overcome frictional losses in lines and valves. All materials of construction were chosen for maximum corrosion resistance and included fluoroplastics, Hastelloy C, and 304 stainless steel.

The spray dryer consists of a hot gas plenum with a perforated plate through which the hot gases (air in the present case) pass prior to contact with the liquid spray, an insulated cylindrical drying chamber with a conical bottom and a cyclone separator to separate the solid polymer powder from the hot gases. The HF/SO$_2$/polymer solution is atomized in a Lurgi two-fluid nozzle with air at a flow rate of approximately 11 SCFM and 20-40 psig being supplied to the nozzle at ambient temperature. The nozzle is located below the perforated plate in the cylindrical chamber on the center line of the cylinder.

The spray dryer, cyclone separator, and associated ducting are constructed of 304 stainless steel with all flanged joints sealed with silicone rubber adhesive sealant. Braided poly(tetrafluoroethylene) protection gaskets are located between the inside surface of the dryer and the sealant. The exhaust gases are cooled in a 304 stainless steel after cooling tower by passing them through several cold water sprays. The gases are then scrubbed in a polypropylene lined caustic scrubbing tower. The nozzle and the supporting lance are constructed of Hastelloy C.

The polymer solution is fed to the two-fluid nozzle at a rate of 17 gal/hr and at a temperature of −6° to ensure that no vaporization of the solvents occurs prior to the discharge end of the nozzle. The hot air, used as the drying medium, enters the dryer at 220° at a rate of 446 SCFM and exits at 160°. Heat losses due to mixing of hot and cold air streams and heat transfer through the insulation account for 20°-30° of the noted temperature drop. The remainder of the thermal energy is used to vaporize the solvent. The hot air enters the spray dryer at a pressure of 30 inches of water and enters the cyclone separator at a pressure of 20 inches of water.

The polymer is collected at the bottom of the cyclone separator in the form of a powder. The powder is heated at 150° under vacuum overnight in an oven to remove the final traces of volatile components prior to extrusion. From a sample taken of the dried material, the elongation is found to be greater than 100%.

The level of fluorine is determined on the spray dried polymer by first carrying out a fusion of the polymer with sodium peroxide at elevated temperature in a sealed nickel bomb ("Chemistry of Organic Fluorine Compounds" by Milos Hudlicky, The MacMillan Co., New York, 1962, p. 332), followed by a spectrophotometric determination of fluorine with a zirconium Eriochrome Cyanine R lake [Stephen Megregian, Anal, Chem., 26, 1161 (1954)]. Polymer so dried is found to contain not more than about 50-100 fluorine.

The novel p-biphenylyloxybenzoic acid monomer of the invention is preferably obtained by Ullmann condensation of p-hydroxybiphenyl (commercially available as a byproduct of phenol synthesis) and p-chlorotoluene to yield the known compound p-biphenylyloxytoluene, which is in turn subjected to cobalt acetate-catalyzed oxidation to form the intended product. Treatment of p-biphenylyloxybenzoic acid with thionyl chloride affords the corresponding acid chloride, which in turn may be converted to the acid fluoride by reaction with anhydrous hydrogen fluoride. The acid ester monomers are obtained at reflux temperature by reaction of the corresponding acid chloride with the appropriate alcohol in the presence of triethylamine, or alternatively by sulfuric acid-catalyzed reaction of the alcohol and p-biphenylyloxybenzoic acid at reflux. The corresponding meta and ortho monomers are similarly obtained, starting from commercially available 3-hydroxybiphenyl and 2-hydroxybiphenyl, respectively. Each of these monomers, is readily polymerizable.

The acid chloride is the preferred monomer from the standpoint of polymerization rate. NMR studies of acid fluoride, ester and acid polymerizations show formation in the HF—BF$_3$ polymerization medium of a carboxonium ion-containing intermediate. In the case of the preferred acid chloride monomer, that intermediate appears to be the highly reactive tetrafluoroborate, i.e.:

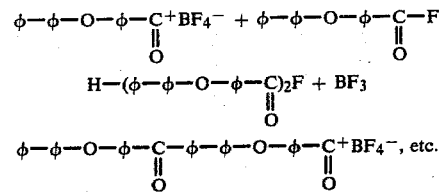

Generally, polymerization is had in the presence of at least one equivalent of boron trifluoride per equivalent of monomer. Since the transient intermediate is rate determining, more boron trifluoride, e.g., from about 1.25 to about 2 or more moles of BF$_3$ for each mole of monomer is preferably used. In the case of biphenylyloxybenzoic acid and acid ester monomers, the respective water and alcohol byproducts of polymerization associate with BF$_3$ in equimolar ratio, so that for consistent obtainment of polymer within the preferred range of inherent viscosity in the case of these monomers, at least 2 moles of BF$_3$ per mole of monomer is desirably employed.

The preferred p-biphenylyloxybenzoyl monomers form crystalline homopolymers, and those monomers may be copolymerized with their meta and/or ortho isomers in amounts yielding not more than 20% ortho and/or meta repeating units while retaining a useful degree of crystallinity. Preferably where considerable crystallinity is desired, not more than about 15% ortho and/or meta comonomer is employed. In such amounts, the comonomers tend to reduce melt viscosity, facilitating extrusion. The crystalline homopolymers of the invention exhibit melt points on the order of 70° C. greater than poly(benzophenone ether), extending the range of high temperature employments to which the polymers may be put, and in the case of all polymers the additional phenyl moiety in the biphenylyloxybenzoyl repeating unit substantially increases the glass transition temperatures. Surprisingly, that additional moiety in the repeating unit substantially stiffens and rigidifies the polymer without adversely affecting elongation, which commonly is greater than 100%. Wire and cable insulation must necessarily exhibit elongation greater than 50% in order that the article may be twisted about itself without stress cracking of its insulation and this is also necessary for other polymer applications. Of course, polymers with elongation less than 50% may be otherwise employed, as in engineering plastics, films and coatings applied by solution coating or plasma techniques. Parenthetically, the polymers of the invention appear to be especially UV-resistant, suggesting their employ in weather resistant coating.

Polymers whose repeating units consist of p-biphenylyloxybenzoyl moieties are substantially less soluble than poly(benzophenone ether). Amorphous polymers formed from ortho- and meta- biphenylyloxybenzoyl monomers are somewhat more soluble, but may be made solvent resistant by thermal crosslinking at temperatures of from about 300°–600° C. after extrusion onto wire, cable or the like. Even where crystalline parahomopolymer is extruded onto wire, advantage may be taken of thermal crosslinking, and in all cases, abrasion resistance, strength, and dimensional stability may be enhanced by annealing extruded coats, as by exposure thereof to temperatures on the order of 250° C. for about 2 minutes. It will be appreciated, of course, that both annealing and thermal crosslinking are inversely time and temperature dependent, and suitable times and temperatures for each will readily occur to the art-skilled from the foregoing, all depending upon contemplated service conditions and like considerations.

EXAMPLE 7 p-Biphenylyloxybenzoyl Chloride "Monomer"

The subject compound was prepared by the reaction of thionyl chloride with p-(4-biphenylyloxy)benzoic acid derived by oxidation from p-(4-biphenylyloxy) toluene. The latter compound is secured by the Ullmann condensation of p-chlorotoluene and biphenyl-4-ol. The procedure was as follows:

p-Biphenylyloxybenzoic Acid

A mixture of 1,123 g (6.6 moles) of biphenyl-4-ol. 396 g (6.0 moles) of potassium hydroxide (85%), 1,519 g (12.0 moles) of p-chlorotoluene, and a catalyst mixture consisting of 7.5 g of CuCl, 3.0 g of CuCl$_2$, 3.0 g of CuCO$_3$.Cu(OH)$_2$ H$_2$O, 3.0 g of copper powder, and 18 g of activated alumina were heated to reflux with stirring for 15 hr. The reaction was conducted under a nitrogen blanket. Water of reaction was removed by azeotropic distillation, and when the pot temperature had reached 167°, 70 ml of dimethylacetamide, 6.0 g of CuCl, 3.0 g of CuCl$_2$, 3.0 g of CuCO$_3$. Cu(OH)$_2$.H$_2$O, 6.0 g of copper, and 14 g of alumina were added. Refluxing was continued for 4 hr. and approximately 20 ml of p-chlorotoluene was removed by distillation. After an additional 10 hr. of reflux the pot temperature was raised to 230° and 180 ml of p-chlorotoluene was distilled off. The reaction mixture was cooled to about 180° and then poured into ice water with stirring. The resulting precipitate was filtered, washed with water, and recrystallized from ethanol to give 1,303 g (5.0 moles, 76%) of p-biphenylyloxytoluene, mp 97° to 99°. Vacuum distillation followed by recrystallization from ethanol gave colorless platelets of mp 99° to 100°. IR (KBr): 1270 cm$^{-1}$ (aryl ether). A 988 g (3.8 moles) sample of this compound was dissolved in 7.5 liters of acetic acid, together with 94.5 g (0.38 mole) of cobalt acetate tetrahydrate, and 3.1 g (0.038 mole) of hydrobromic acid. Oxygen was passed through the solution with stirring and heating to 100°. After approximately 3 hours, the reaction was complete. After cooling to room temperature, the resulting crystalline precipitate was filtered and recrystallized from o-dichlorobenzene to give 799 g (2.75 moles, 72%) of colorless crystals, mp 243° to 244°, IR(KBr): 1700 cm$^{-1}$ (acid carbonyl), 1280 cm$^{-1}$ (aryl ether). Reaction of 798.0 g (2.75 moles) of acid with 399.0 ml (5.50 moles) SOCl$_2$ in 1500 ml benzene (containing 4 drops pyridine) at 60°–70° followed by vacuum distillation (up to 215° at 0.40 mm Hg) yielded 805.7 g (95.0%) colorless crystals of p-(4-biphenylyloxy)benzoyl chloride of mp 93.5°–94.7° and a light-brown forecut of 20.86 g (2.46%).

EXAMPLE 8

Polymerization of p-Biphenylyloxybenzoyl Chloride in HF

A 50 ml poly(chlorotrifluoroethylene) tube was charged with 3.0568 g (9.90 m moles) of p-(biphenyloxybenzoyl chloride), 0.0154 g (0.1 m moles) of biphenyl capping agent and a stir bar. The reaction tube was cooled to −196° C. and 10 ml of anhydrous hydrogen fluoride was added. The tube was connected to a poly(chlorotrifluoroethylene) vacuum line (Toho Kasei Co., Ltd.) and allowed to warm to 0°. Hydrogen chloride evolved and built up to a pressure of 22 psi. The resulting colorless suspension of acyl fluoride in HF was purged with nitrogen at 0° to remove the hydrogen chloride, and it was then pressured up with boron trifluoride to 50 psi and polymerization proceeded over a period of 16 hours at room temperature. Magnetic stirring proved infeasible in view of the sizable solids content of the reaction mixture, so that on 3 occasions the vessel was cooled to 0° C., opened and manually stirred with a spatula. In each case, after stirring, the vessel was again sealed, repressurized with BF₃, and brought to room temperature. A dark-red viscous solution resulted, which contained a sizeable amount of solid residue which was diluted with 150 ml hydrogen fluoride. The resulting homogenous solution was precipitated into rapidly-stirred methanol, to give a colorless, fluffy, solid of inherent viscosity 1.42 (0.1 g/100 ml conc. sulfuric acid, 25° C.).

Other acid chloride polymerization in the presence of varying amounts of biphenyl capping agent affected molecular weight control as shown in the Table.

TABLE

| Mole % biphenyl | $\eta$inh (0.1 g/100 ml conc. $H_2SO_4$ at 25°) |
| --- | --- |
| 0.50 | 2.30 ± .08 |
| 1.00 | 1.37 ± .05 |
| 1.50 | 0.94 ± .045 |

EXAMPLE 9

Preparation and Polymerization of Ethyl p-Biphenylyloxybenzoate

Ethanolysis of p-biphenylyloxybenzoyl chloride in the presence of several drops of triethylamine followed by distillation of excess ethanol and triethylamine left a residue of pure para ethyl biphenylyloxybenzoate: colorless crystals, mp 75.7° to 76.5°. Elemental Anal. Calcd. for $C_{21}H_{18}O_3$: C, 79.22; H, 5.70. Found: C, 79.09, H, 5.75. IR (KBr): 1705 cm$^{-1}$ (ester carbonyl), 1280 cm$^{-1}$ (aryl ether).

A 50-ml poly(chlorotrifluoroethylene) tube was charged with 3.1519 g (9.90 m moles) of ethyl p-biphenylyloxybenzoate, 0.0154 g (0.10 m moles) of biphenyl, a stir bar, and 20 ml of anhydrous hydrogen fluoride. The tube was connected to a poly(chlorotrifluoroethylene) vacuum line and the reaction mixture was stirred at room temperature to give a colorless solution within a few minutes. A BF₃ pressure of 50 psi was then applied and held for 22 hr at room temperature with occasional opening of the vessel for manual agitation as in Example 2. A dark red viscous solution resulted which contained a sizable amount of solid precipitate. The BF₃ pressure was released at 0° and the reaction product was brought into solution by addition of approximately 150 ml of anhydrous hydrogen fluoride. This solution was precipitated into rapidly stirred methanol to yield a colorless fluffy solid with an inherent viscosity of 0.88 (0.1 g/100 ml concentrated sulfuric acid, 25°).

EXAMPLE 10

Preparation and Polymerization of Methyl p-Biphenylyloxybenzoate

Methanolysis of p-biphenylyloxybenzoyl chloride in the presence of several drops of triethylamine, followed by distillation of triethylamine and excess methanol provided methyl p-biphenylyloxybenzoate as a colorless solid melting at 151.5°–152° C. The compound was polymerized with 1 mole % biphenyl capping reagent as in Example 2, yielding colorless polymer of inherent viscosity of 1.03.

EXAMPLE 11

Polymerization of p-Biphenylyloxybenzoic Acid

A 50 ml poly(chlorotrifluoroethylene) tube was charged with 2.874 g (9.90 m moles) of p-biphenylyloxybenzoic acid, 0.0154 g (0.1 mmole) of biphenyl, a stir bar and 20 ml of anhydrous hydrogen fluoride. The sample tube was then held under a pressure of 50 psi of BF₃ at room temperature for 16 hours. Polymerization proceeded as in Example 2 giving a dark-red viscous solution containing a sizeable amount of solid precipitated material. After a 15 fold dilution with anhydrous hydrogen fluoride and precipitation into methanol, a colorless, fluffy, material was obtained with an inherent viscosity of 1.35

EXAMPLE 12

Polymerization of p-Biphenylyloxybenzoyl Chloride in a Mixture of Sulfur Dioxide and Hydrogen Fluoride p-Biphenylyloxybenzoyl chloride polymerizes readily in a mixture of sulfur dioxide, hydrogen fluoride, and boron trifluoride to give a homogeneous polymer solution.

A 50 ml poly(chlorotrifluoroethylene) tube was charged with 3.0568 g (9.90 mmoles) of p-biphenylyloxybenzoyl chloride, 0.0154 g (0.10 mmoles) of biphenyl and a stir bar, followed by addition of 10 ml of cold (−78°) hydrogen fluoride containing 50 vol. % sulfur dioxide. The tube was connected to a poly(chlorotrifluoroethylene) vacuum line and allowed to come to room temperature within 2.5 hr. The tube was then cooled to 0° and the pressure was reduced to 2 psi. After permitting the reaction mixture to warm to room temperature, a BF₃ pressure of 50 psi was applied and held for 22 hr. A dark-red completely homogeneous polymer solution resulted which was diluted with a mixture of sulfur dioxide and hydrogen fluoride and then poured into rapidly agitated, cold (−78°) methanol. A white, fluffy solid was obtained, which showed an inherent viscosity of 2.65 (0.1 g/100 ml concentrated sulfuric acid, 25°).

The polymers of the invention may of course, incorporate comonomers calculated to contribute properties of advantage, e.g., greater strength and crystallinity, higher melting point, etc. Thus, for example, from about 5 to 50% by weight of comonomers such as p-(phenylthio)benzoyl chloride, m-phenoxybenzoyl chloride, alpha-naphthoyl fluoride, beta-naphthoyl fluoride, 5-(alpha-naphthoxy)-alpha-naphthoyl chloride, 5-(alpha-naphthylthio)-alpha-naphthoyl chloride, 5-(alpha-naphthyl)-alpha-naphthoyl chloride, 6-(beta-naphthoxy)-beta-naphthoyl chloride, 2-dibenzofuran carbonyl chloride, 2-thianthrene carbonyl chloride, 2-phenoxathiin carbonyl chloride, 2-phenodioxin carbonyl chloride, 2-dibenzothiophene carbonyl chloride, 3(4'-biphenyloxy) benzoyl fluoride, 4(4'-biphenyloxy) benzoyl fluoride, 3(2'-biphenyloxy) benzoyl fluoride, 4(2'-biphenyloxy) benzoyl fluoride, 3-(2' naphthoxy) benzoyl fluoride, 4-(2' naphthoxy) benzoyl fluoride can be employed in the polymerization. Monomers suitable for copolymerization with phenoxybenzoyl fluoride can generally be formed by the reaction of nucleophilic materials such as diphenyl sulfide 4,4'-diphenoxybiphenyl, p-phenoxyphenol, 2,2'-diphenoxybiphenyl, p-phenylphenol 1,4-diphenoxybenzene, dibenzofuran 1,3-diphenoxy-benzene, thianthrene, 1-phenoxy-naphthalene, phenoxathiin, 1,2-diphenoxynaphthalene, phenodioxin, diphenyl ether, diphenylene, 1,5-diphenoxynaphthalene with electrophilic materials such as phosgene, carbonyl difluoride, isophthaloyl chloride, benzene-1, 4-di(sulfonyl chloride), benzene-1, 3-di(sulfonyl chloride), 2-chlorobenzene-1,4-disulfonyl chloride, thio-bis (4,4'-benzoyl chloride), oxy-bis (4,4'-benzene sulfonyl chloride), benzophenone-4,4'-di(carbonyl chloride), oxy-bis (3,3'-benzoyl chloride), thio-bis (3,3'-benzene sulfonyl chloride), oxy-bis (3,3'-benzene sulfonyl chloride), diphenyl-3,3'-di(carbonyl chloride), carbonyl-bis(3,3'-benzoyl chloride), sulfonyl-bis(4,4'-benzoyl chloride) sulfonyl-bis(3,3'-benzoyl chloride), sulfonyl-bis (3,4'-benzoyl chloride), thio-bis(3,4'-benzoyl chloride), diphenyl-3,4'-di(carbonyl chloride), oxy-bis(4,4'-(2-chlorobenzoyl chloride)), naphthalene-1,6-di(carbonyl chloride), naphthalene-1,5-di(carbonyl chloride), naphthalene-2,6-di(carbonyl chloride), naphthalene-1,5-di(sulfonyl chloride), oxy-bis(7,7'-naphthalene-2,2'-di(carbonyl chloride)), thio-bis (8,8'-naphthalene-1,1'-di(carbonyl chloride)), 7,7'-binaphthyl-2,2'-di(carbonyl chloride), diphenyl-4,4'-di(carbonyl chloride). Again, for example, m-phenoxybenzoyl fluoride can be copolymerized with the para isomer where high melting point and solvent resistance are not especially critical.

Of course, Friedel-Crafts catalysts other than BF₃ could be employed, e.g., AsF₅, PF₅, etc., but boron trifluoride is preferred for preparing polyarlketones from the standpoint of ease of removal, relative non-toxicity and like considerations. Indium trichloride is the preferred catalyst for preparing polyaryl sulfones. The preparation of polyarylsulfones is desirably carried out in a nitrobenzene solvent medium. For example, the polymerization can be carried out at 150°-200° C. using 0.5 mole of InCl₃ with an appropriate amount of the molecular weight control agent.

These and other variations on the preferred embodiments disclosed above will clearly appear to the art-skilled from the preceding detailed discussion. In any case, it will be recognized that the for first time there are provided by this invention polyketone polymers which are at one and the same time high temperature resistant, melt processable, and of elongation sufficient for employment in wire and cable insulation.

I claim:
1. A process for producing a polymer comprising polymerizing at least one monomer under Friedel-Crafts conditions, said monomer having both an electrophillic and a nucleophillic reaction center under said Friedel-Crafts conditions, the electrophillic center on one monomer molecule reacting with the nucleophillic center on another to propagate said polymer, in the presence of a molecular weight control agent that reacts only as a nucleophile under the reaction conditions.

2. A process according to claim 1 wherein the molecular weight control agent is an aromatic compound whose rate of acetylation relative to benzene is greater than about 150.

3. A process according to claim 2 wherein said molecular weight control agent is a monofunctional nucleophile under the Friedel-Crafts conditions.

4. A process according to claim 3 wherein said control agent is biphenyl.

5. A process according to claim 2 wherein said molecular weight control agent is a difunctional nucleophile under the Friedel-Crafts conditions.

6. A process according to claim 5 wherein the control agent is diphenyl ether.

7. A process according to claim 1 wherein the monomer is a compound of the formula Ar—L—Ar¹—X, wherein X is selected from SO₂Y or COY, Y being a radical selected from —OH, halogen, or alkyl, wherein Ar and Ar¹ are independently

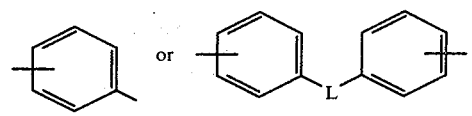

wherein L is —CO—, —SO₂—, phenyleneoxy, —NH-CO—, a covalent bond, —O—, or CR₂—, wherein each R is independently hydrogen, an alkyl or fluoroalkyl group, phenyl or a phenyl group substituted by an electron withdrawing group such as halogen, —NO₂ or —CN.

8. A process according to claim 7 wherein the monomer is selected from the group consisting of

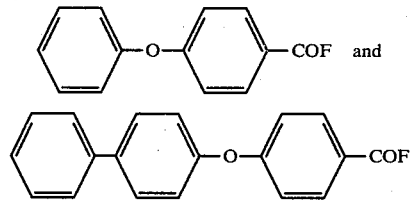

9. A process according to claim 8 wherein the Friedel-Crafts polymerization is catalyzed by BF₃.

10. A process according to claim 9 wherein the polymerization is carried out in a solvent of hydrogen fluoride.

11. A process according to claim 7 wherein the monomer is selected from the group consisting of

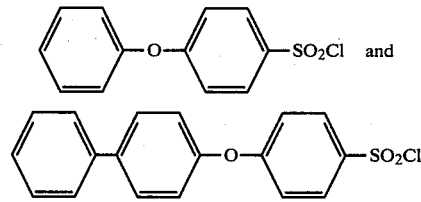

12. A process according to claim 11 wherein the catalyst is indium trichloride.

13. A process according to claim 12 wherein the polymerization is carried out in a solvent of nitro benzene.

14. A process according to claim 1 wherein the polymerization results in a polymer having a mean inherent viscosity within the range 0.8 to 1.65 at 25° C. for a solution having a concentration of 0.1 g polymer per 100 ml. H₂SO₄.

15. A process according to claim 11 wherein the polymer resulting from the polymerization has a mean inherent viscosity within the range of 0.8 to 1.65 at 25° C. for a solution having a concentration of 0.1 g. polymer per 100 ml. H₂SO₄.

16. A polymer of the structure (NE)ₓ—M wherein (NE)ₓ is a polymer chain of X repeating units derived from the polymerization of a monomer unit EN having both an electrophillic reaction center E and a nucleophillic reaction center N under Friedel-Crafts reaction conditions, the electrophillic center of one monomer unit reacting with the nucleophillic reaction center of another to propagate said polymer chain, and —M is a moiety arising from the reaction of an electrophillic center on said polymer chain with a molecular weight control agent of the formula M-H having a single nucleophillic reaction center under the reaction conditions.

17. A polymer according to claim 16 wherein M— is

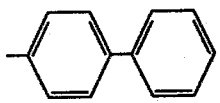

18. A polymer according to claim 16 wherein said monomer is a compound of the formula Ar—L—Ar$^1$—X, wherein X is selected from SO$_2$Y or COY, Y being a radical selected from —OH, halogen, or alkyl, wherein Ar and Ar$^1$ are independently

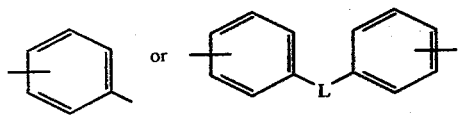

wherein L is —CO—, —SO$_2$—, phenyleneoxy, —NHCO—, a covalent bond, —O—, or —CR$_2$—, wherein each R is independently hydrogen, an alkyl or fluoroalkyl group, phenyl or a phenyl group substituted by an electron withdrawing group such as halogen, —NO$_2$ or —CN.

19. A polymer according to claim 18 of formula

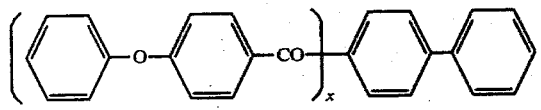

20. A polymer according to claim 18 having the structure

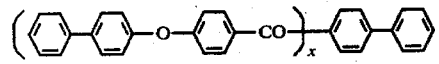

21. A polymer according to claim 18 of formula selected from the group consisting of

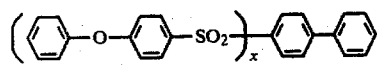

-continued
and

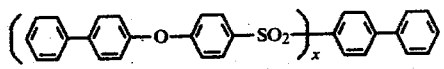

22. A polymer according to claim 21 having a mean inherent viscosity within the range 0.8 to 1.65 at 25° C. for a solution having a concentration of 0.1 g. polymer per 100 ml. H$_2$SO$_4$.

23. A polymer of the structure (NE)$_x$—M'—(EN)$_y$ wherein (NE)$_x$ and (EN)$_y$ are polymer chains of x and y repeating units respectively derived from the polymerization of a monomer unit EN having both an electrophillic reaction center E and a nucleophillic reaction center N under Friedel-Crafts reaction conditions, the electrophillic center of one monomer unit reacting with the nucleophillic reaction center of another to propagate said polymer chain, and —M'— is a moiety arising from the reaction of an electrophillic center on each of said polymer chains with a molecular weight control agent of the formula H—M'—H having two nucleophillic reaction centers under the reaction conditions.

24. A polymer according to claim 23 wherein M' is

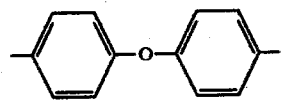

25. A polymer according to claim 23 wherein said monomer is a compound of the formula Ar—L—Ar$^1$—X, wherein X is selected from SO$_2$Y or COY, Y being a radical selected from —OH, halogen, or alkyl, wherein Ar and Ar$^1$ are independently

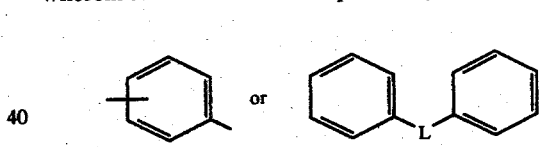

wherein L is —CO—, —SO$_2$—, phenyleneoxy, —NHCO—, a covalent bond, —O—, or —CR$_2$—, wherein each R is independently hydrogen, an alkyl or fluoroalkyl group, phenyl or a phenyl group substituted by an electron withdrawing group such as halogen, —NO$_2$ or —CN.

26. A polymer according to claim 25 of formula

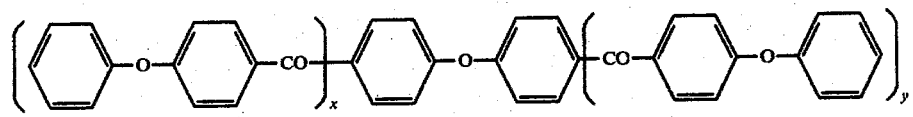

27. A polymer according to claim 25 of formula

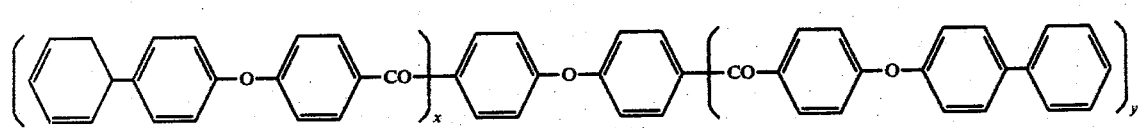

28. A polymer according to claim 25 of formula selected from the group consisting of

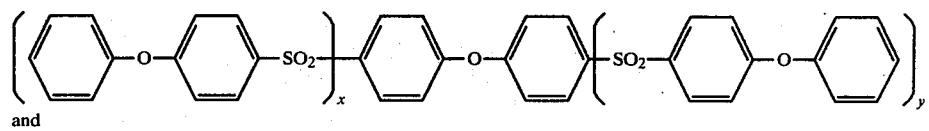
and
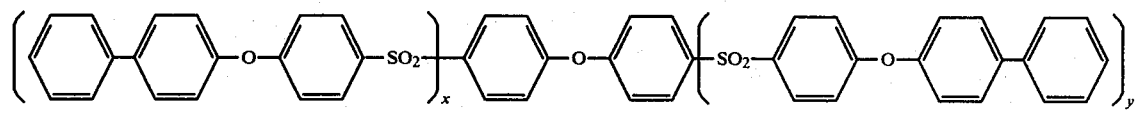
29. A polymer according to claim 21 having a mean inherent viscosity within the range from about 0.8 to 1.65 at 25° C. for a solution having a concentration of 0.1 g. polymer per 100 ml. $H_2SO_4$.
* * * * *